(12) United States Patent
Aberg et al.

(10) Patent No.: US 6,644,239 B1  
(45) Date of Patent: Nov. 11, 2003

(54) VALVE, MILKING CLAW AND MILKING SYSTEM

(75) Inventors: Jerker Aberg, Stockholm (SE); Torbjorn Petterson, Gnesta (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 10/110,066

(22) PCT Filed: Oct. 5, 2000

(86) PCT No.: PCT/SE00/01928

§ 371 (c)(1),
(2), (4) Date: Aug. 28, 2002

(87) PCT Pub. No.: WO01/26451

PCT Pub. Date: Apr. 19, 2001

(30) Foreign Application Priority Data

Oct. 8, 1999 (SE) .............................................. 9903633

(51) Int. Cl.[7] .............................. A01J 7/00; F16K 21/00
(52) U.S. Cl. ...................................... 119/14.44; 251/279
(58) Field of Search ........................... 119/14.44, 14.47, 119/14.48, 14.51, 14.55; 251/213, 231, 279–280

(56) References Cited

U.S. PATENT DOCUMENTS

| | | | | |
|---|---|---|---|---|
| 3,986,525 A | * | 10/1976 | Slaughter, Jr. .......... | 137/630.14 |
| 4,314,526 A | | 2/1982 | Nordenskjold | |
| 4,955,408 A | * | 9/1990 | Meermoller ................ | 137/470 |
| 5,010,844 A | * | 4/1991 | Takeuchi et al. .......... | 119/14.25 |

FOREIGN PATENT DOCUMENTS

| | | |
|---|---|---|
| DE | 314565 | 9/1919 |
| DE | 919145 | 10/1954 |
| GB | 881282 | 11/1961 |

* cited by examiner

Primary Examiner—Yvonne Abbott  
(74) Attorney, Agent, or Firm—Young & Thompson

(57) ABSTRACT

A diaphragm valve for shutting off milk flow through a claw (13) of a vacuum driven milking machine has, in a preferred embodiment, a lever (5) linked (6), outside the milk flow, to the diaphragm (4), thereby avoiding any bushings which are prone to leakage. The lever (5) can be swung manually to a position holding the diaphragm away from its seat thereby permitting milk flow. In the automatically closing embodiments, the lever is swung in this case against the bias of a spring (7) and is retained in this open position if the suction force acting on the diaphragm (4) and the link (6) is sufficient to overcome the bias of the spring (7), which will be the case when there is normal milk flow through the valve. Upon detachment of the tea from the animal's teat only air will flow through the valve, thereby reducing the suction force exerted on the link (6) and allowing the spring (7) to swing the lever away from its valve-open position to a diaphragm-release position where the air suction will pull the diaphragm to seal against its seat and cut off potentially contaminating air-flow through the system. This inventive principle can, for example, also be embodied in a rotary knob (21) linked to the diaphragm (4) and interacting with indined grooves (23) and springs (24) biasing the knob to advance to a diaphragm-release position when there is insufficient milk flow. Such a system is particularly useful in sheep or goat dairies where there is frequent attachment and detachment of the clusters.

11 Claims, 4 Drawing Sheets

US 6,644,239 B1

VALVE, MILKING CLAW AND MILKING SYSTEM

TECHNICAL FIELD OF THE INVENTION

The present invention relates in general to a milking claw incorporating a novel valve design suitable for use in a milking machine as well as to a milking system incorporating suitably a plurality of such valves.

BACKGROUND ART

In known suction actuated milking systems, use has been made of a claw, providing a confluence for the milk flowing in from all the teatcups of the cluster, two teatcups in the case of equipment for milking goats or sheep and four teatcups for milking cows. The milk flows from the claw to a milk-receiving vessel. It has been found advantageous to provide a means to shut off the flow of air through the valve when the teatcups are removed from or fall off the teats, or prior to removal of the teatcups from the teats. This can be accomplished both manually and automatically. Known claw valves generally used for this purpose utilize a central shaft provided with a knob outside the valve body for manual operation, and a conical element sealing against a valve seat in its closed position. One such valve is shown and described in GB-B 881 282. This valve, with its through-shaft extending from the flow chamber to the outside air, has been prone to leakage, allowing impurities to be drawn into the system. The pulling and pushing of the knob necessary to open or close the valve requires the use of two hands and can have ergonomic disadvantages when repeated many times.

After removal of the teatcup, this known valve is designed to automatically shut off when air flows, at an elevated flow rate, through the valve from the teatcup, as a result of the dynamic force of the rapidly moving air on the bottom of the valve element, and reduced counterpressure on the other side of the element. Unfortunately, the valve may also unintentionally close if there is a very high rate of milk flow, which is clearly disadvantageous.

OBJECT OF THE INVENTION

The object of the present invention is thus to provide a milking claw and a milking system incorporating such claws, which do not have these disadvantages, in a simple, reliable and easily operated design having a completely sealed of chamber with no penetrating elements.

SUMMARY OF THE INVENTION

The present invention fulfills these and other objects by providing a milking claw valve for shutting off and turning on vacuum-induced flow from a teatcup or teatcups in a milking machine, said valve including: a valve body having at least one inlet for milk flow from a teatcup and an outlet for milk flow from said valve, as well as a valve seat, a diaphragm mounted in said valve body said diaphragm being movable between an open position permitting flow from said inlet(s) to said outlet, and a closed position sealing against said valve seat, cutting off flow between said inlet(s) and said outlet, a manual actuator mounted in or on said valve body to swing or rotate between at least first and second positions, a non-extendible link connected between said manual actuator and a point on said diaphragm; the diaphragm being held in its open position by means of said link when said manual actuator is in its first position; the diaphragm being released to allow it to assume its closed position, when said manual actuator is moved to its second position; said diaphragm, when in its open position, exerting via the link a force on the manual actuator, urging it towards its first position.

According to a preferred embodiment of the present invention the manual actuator, which, for example, can be a lever or rotatable knob is biased towards its second position; said diaphragm, when in its open position, exerting via the link an opposing force on the manual actuator, urging it towards its first position; said opposing force, when there is a predetermined suction which induces liquid flow through the valve body, overcoming the biasing force urging the actuator towards its second position; said opposing force not overcoming the biasing force when there is a drop below said predetermined suction for the liquid flow through the valve.

This provides for automatic closing without the disadvantages of inadvertent closing.

The present invention also encompasses a claw comprising a valve according to the invention, and a milking system comprising: a vacuum source, a milk receiving container, at least one cluster having a claw according to the invention and at least two teatcups.

DRAWING SUMMARY

The invention will now be described with reference to a non-limiting example shown in the accompanying drawings of which:

Figure 4:
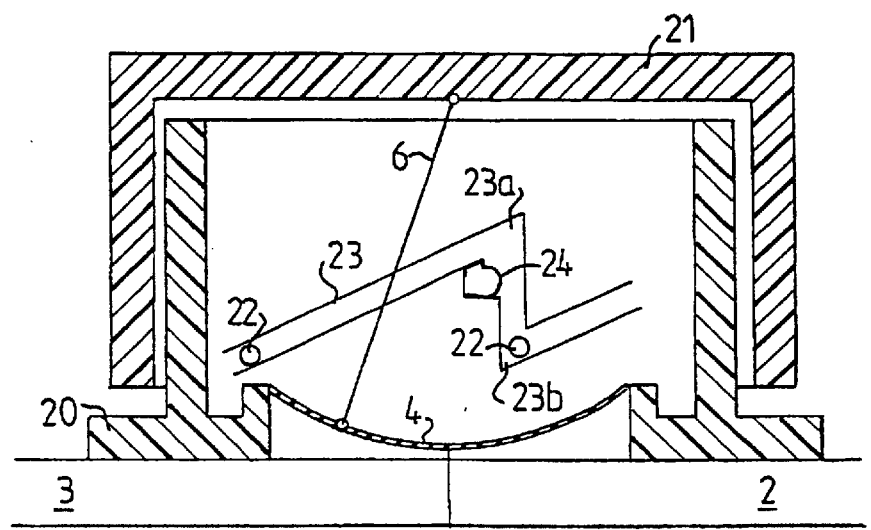
FIG. 4 shows purely schematically a second embodiment of a valve according to the invention in its closed position.
Figure 5A:
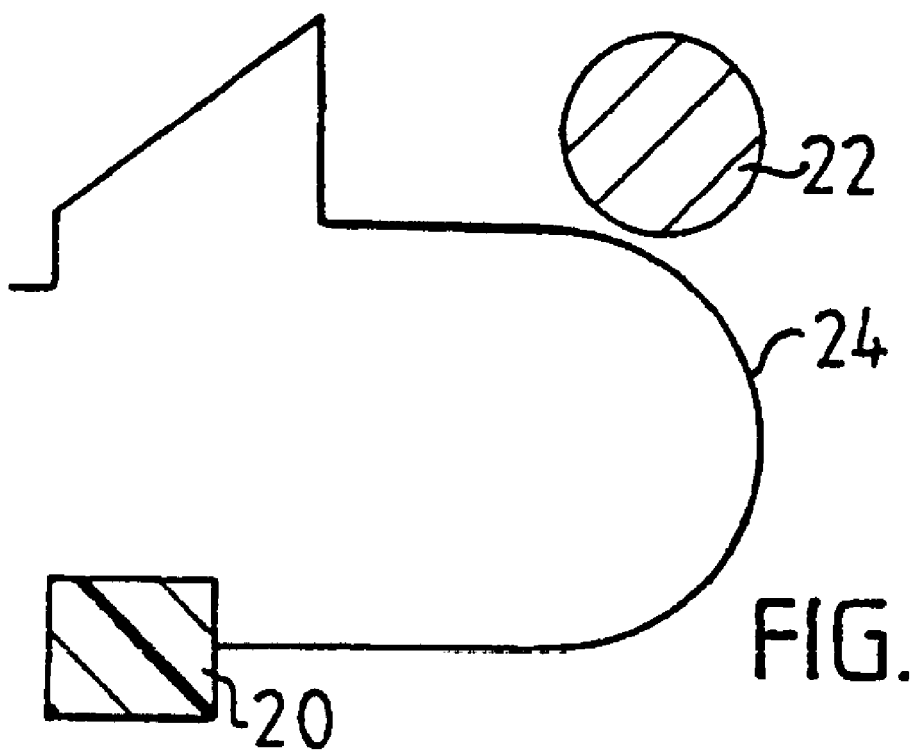
Figure 5B:
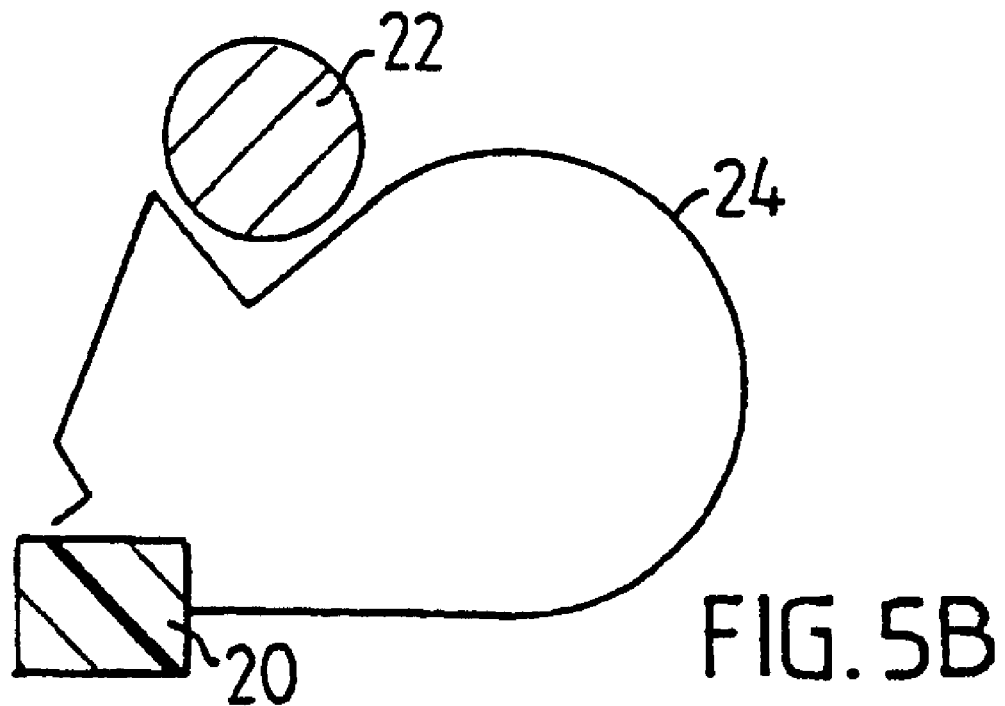

FIGS. 5(a) and 5(b) show schematically the spring and pin in FIG. 4 in a valve releasing position and in a valve-closed position respectively.

Figure 6:
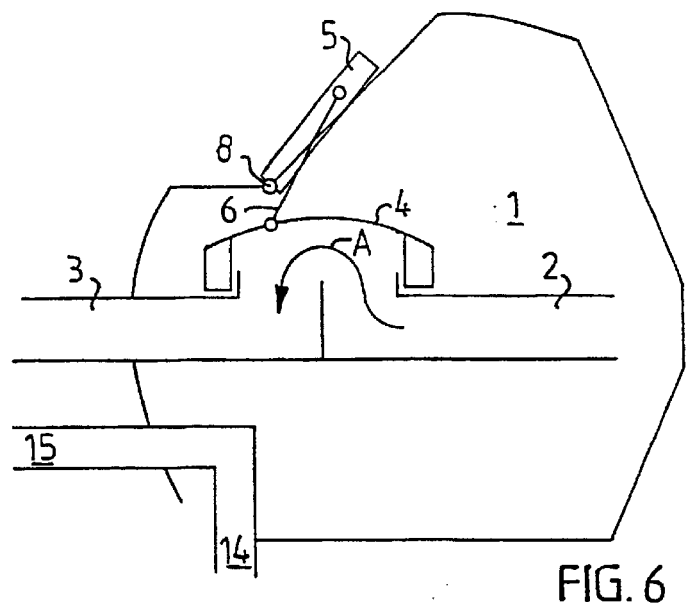
Figure 7:
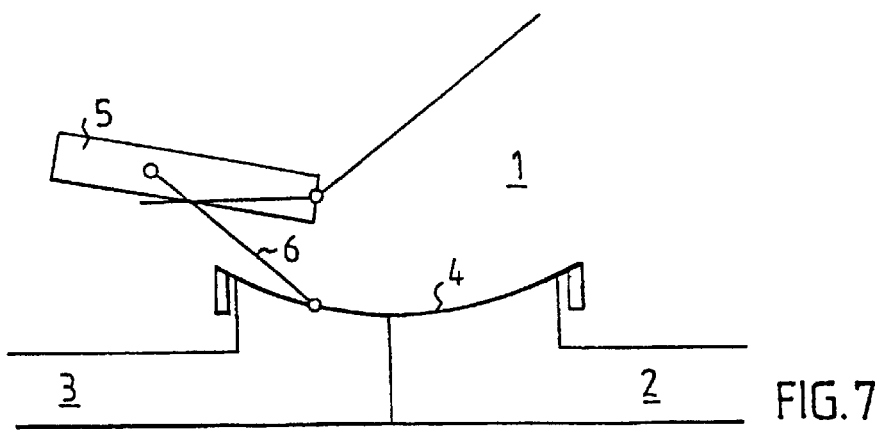

FIGS. 6 and 7 show schematically the open and closed positions respectively of an embodiment of the invention similar to that described in connection with FIGS. 2 and 3, but without any biasing spring.

Figure 8:
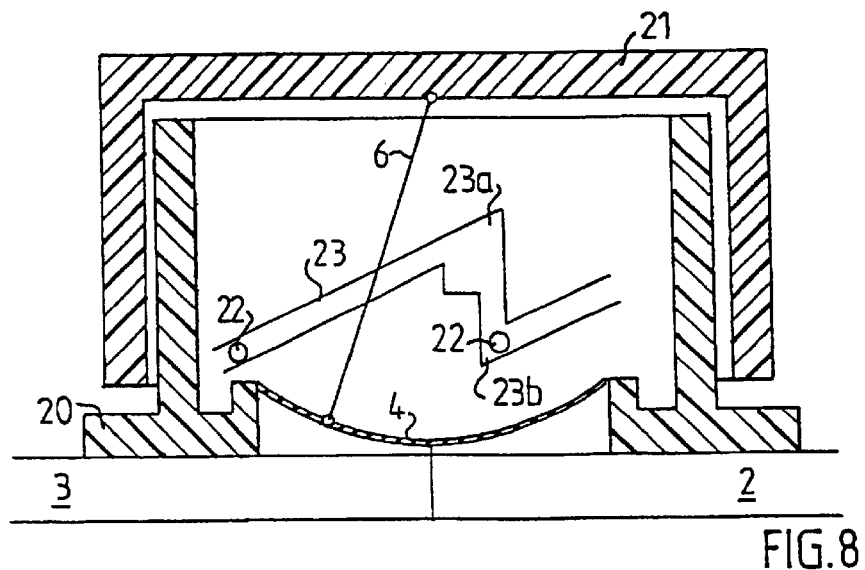

FIG. 8 shows an embodiment in its closed position intended for manual operation corresponding to that described in connection with FIG. 4, but without any biasing spring.

DETAILED DESCRIPTION

Figure 1:
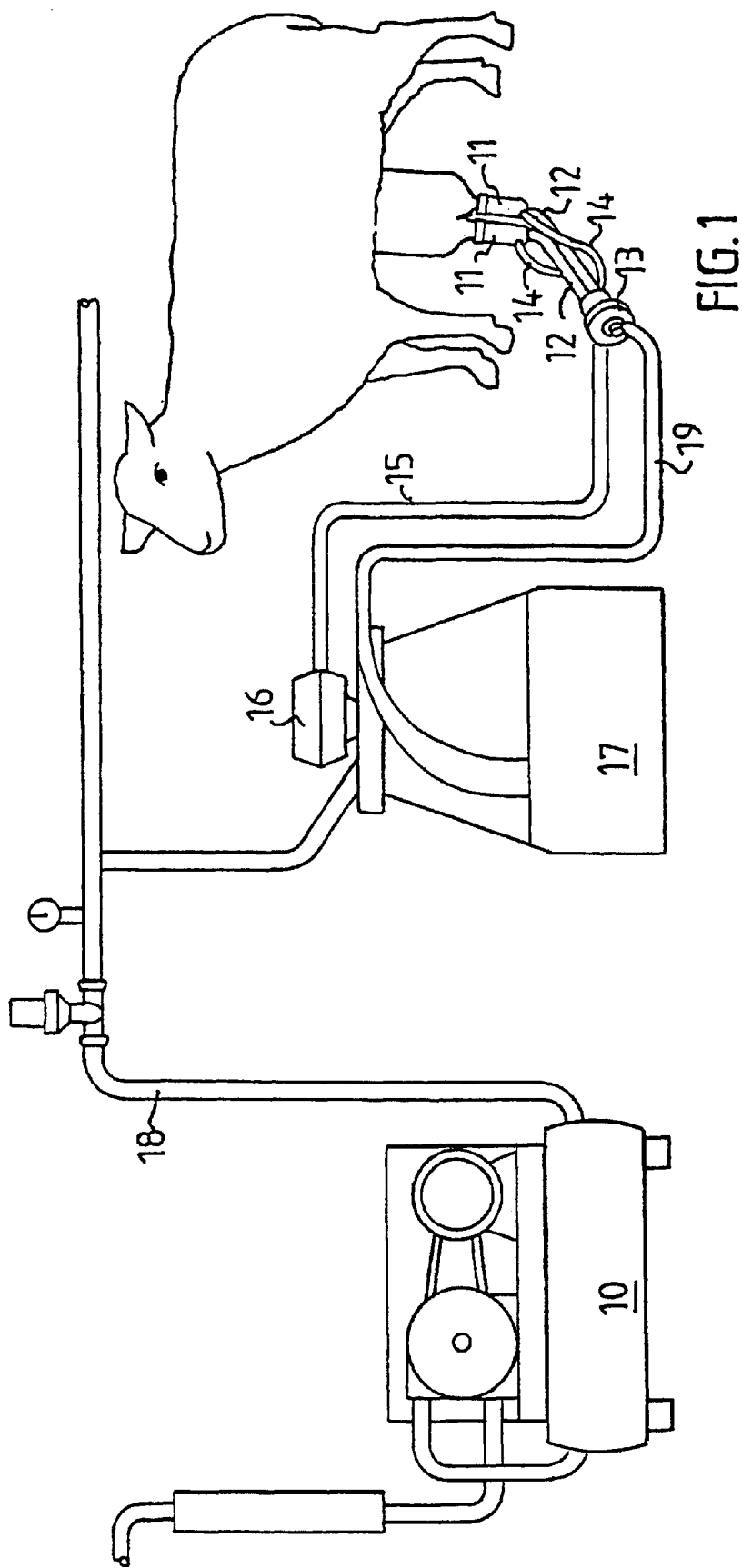
FIG. 1 shows schematically a milking system according to the invention.

FIG. 1 shows schematically one example of a milking system in accordance with the present invention, in this case a system for milking sheep. A number of milking stations, of which only one is shown here, are driven by a common vacuum pump 10. Two teatcups 11 are attached to the sheep's teats, which are milked in a well-known manner by a pulsating vacuum provided through short and long pulse tubes 14 and 15, respectively. Short milk tubes 12 lead from the teatcups 11 to the inventive valve contained in the claw 13, and from said valve, the milk flows out of the claw via the long milk tube 19 to a receiving tank 17.

Figure 2:
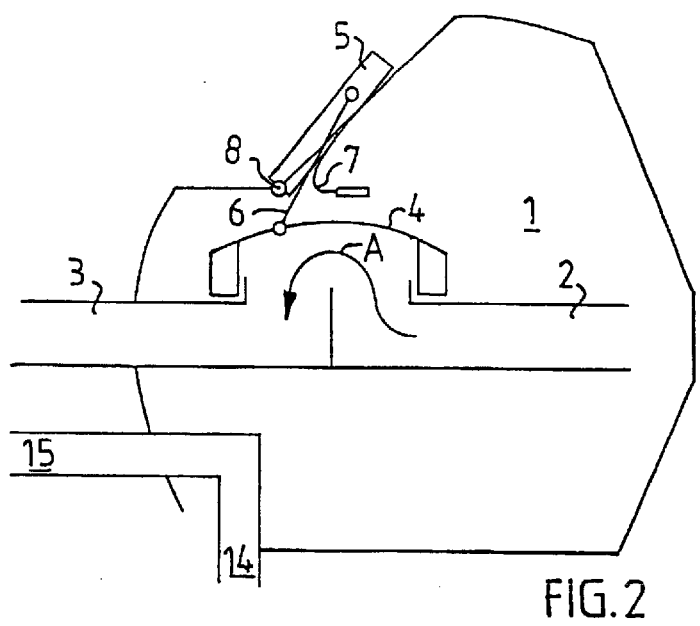
FIG. 2 shows purely schematically a first embodiment of a valve according to the invention in its open position.

FIG. 2 shows very schematically a first embodiment of the valve 1 according to the invention, which can be housed in the claw 13 shown in FIG. 1. The inlet 2 of the valve conducts milk flow coming from the tubes 12 into the valve, and, when the valve is in the open position shown in FIG. 1, out through the outlet 3 to the tube 19 and the tank 17 as shown in FIG. 1. A diaphragm (4) of flexible elastic material is disposed, when it is in the open position shown in FIG. 2, to permit, without any leakage, flow between the inlet 2 and the outlet 3 in the direction of the arrow A. When the diaphragm is in the closed position shown in FIG. 3, it seals against a seat covering both the inlet tube 2 and the outlet tube 3 and cuts off the flow of milk and/or air into the outlet tube 3.

The diaphragm is held in the open position shown in FIG. 2, against the suction drawing the milk through the valve by a link 6 attached to the portion of the diaphragm above the outflow. The link 6 may be flexible, but is non-extensible. The other end of the link 6 is attached to a lever 5, which is pivotally mounted about a pivot point 8 in the valve body 1. When the lever is in its right-hand end position shown in FIG. 2 resting against an abutment in the valve body, the membrane is held up in its open position. When the lever 5 is pivoted to its left-hand end position shown in FIG. 3, the diaphragm is released, and if there is any suction in the outlet tube 3, the diaphragm will then close the valve, as shown in FIG. 3. It is possible to switch this lever manually or in the manner which will be described in the next paragraph.

Figure 3:
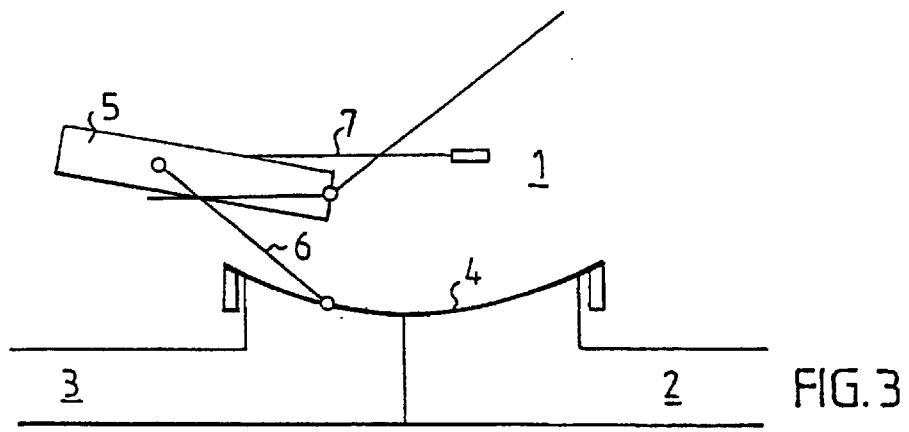
FIG. 3 shows purely schematically a detail of the same valve in its closed position.

The lever is biased by a spring 7, in this case a leaf spring, to assume the position shown in FIG. 3, i.e. the closed position. When there is sufficient suction force on the membrane, in this case when milk is drawn through the valve, a tensile force will be exerted on the link 6, thereby exerting a force on the lever, in its open position shown in FIG. 2, which counteracts the force of the leaf spring 7. Thus, as long as there is suction and the milk is flowing through the valve, the lever will be held in its open position shown in FIG. 2, unless it is moved manually to its other position. Should there be a drop in the suction force acting on the portion of the diaphragm to which the link 6 is attached, then the leaf spring 7 will be able to flip the lever over to the position shown in FIG. 3. This drop in suction force will occur if the teatcup is removed, either intentionally or by being kicked off by the animal from the animal's teat and air instead of milk begins to be drawn through the valve. The vacuum, now drawing air, will cause the diaphragm to seal against the seat as shown in FIG. 3. This will prevent any dirt or straw from being drawn into the system. It will also prevent variations in the general vacuum level in the system when moving a cluster from one animal to another. This is particularly advantageous in sheep and goat dairies where the clusters are moved more frequently than in cow or buffalo dairies.

A second embodiment of a valve according to the invention is illustrated schematically in FIG. 4. Parts having counterparts in the previously described embodiment have been given the same reference numerals. In this case the schematically shown valve body 20 is round and has one or more inlets 2 and an outlet 3 as well as a diaphragm 4, which is shown in this case in its closed position sealing against the seat and thereby cutting off milk flow between inlet and outlet A swivel link 6 connects the outlet side of the diaphragm 4 with a rotary knob 21 which is rotatably mounted on the round portion of the valve body 20, the outside cylindrical surface of which is provided with a sawtooth shaped groove extending around its entire periphery. For good balance, this sawtooth groove in the periphery of cylindrical portion of the valve body 20 should have at least three peaks, and it will be assumed in this case that there are three peaks, although other embodiments may employ a larger number. In this case, three pins 22, integral with the knob 21 extend into the groove from positions evenly spaced around the interior cylindrical surface of the knob. Each peak is provided with a leaf spring 24.

As the knob 21 is rotated manually, each of the three pins 22, integral with the knob, moves up the inclined helical groove from the lowest point 23b to the peak 23a, thereby pulling, via the swivel link 6, the diaphragm 4 away from its seat, thereby opening the flow passage. Upon reaching the peak each of the pins 22 will come into contact with a spring 24. If there is sufficient suction force, produced when there is milk flowing past the left-hand (as seen in FIG. 4) side of the diaphragm, then each spring 24 will be held depressed in its position shown in FIG. 5(b), and the valve will be held in its open position. If the suction force is insufficient, due to only air flowing through the valve for example, then each spring 24 will push its pin 22 forward as shown in FIG. 5(a) to the straight drop portion of the groove, whereupon the air suction in the system will pull the diaphragm, and with it the link 6 and the knob 21 with its pins 22 down once again to the position shown in FIG. 4 (advanced ⅓ of a turn).

The valve may of course also be closed manually by turning the rotating the knob very slightly from the peak position to the straight drop portion.

FIGS. 6 and 7 show purely schematically the open and closed positions respectively of an embodiment of the invention similar to that described in connection with FIGS. 2 and 3 but without any biasing spring. Corresponding components have been given the same reference numerals as in FIGS. 2 and 3. This valve is intended for manual operation without the automatic closing feature of the speing biased valves described above.

FIG. 8 shows in a similar manner an embodiment, in its closed position, intended for manual operation corresponding to that described in connection with FIG. 4, but where the biasing spring has been eliminated and corresponding components have received the same reference numerals as in FIG. 4.

It will be understood that although this description refers to "peaks", "straight drop", "lowest point" etc., this vertical reference is only for ease in following the description of the drawings and that in actual use the valve, when incorporated into a milk claw and a cluster, will in fact be upside-down or turned 90° relative to what is shown in the figures. The valve responds to vacuum and not gravity.

In addition to the two embodiments described above of the valve according to the invention, many other valve designs within the scope of the claims are also possible, for example instead of a lever or a knob, a design using a link-connected cam with a top dead-center point, which is stable only when there is sufficient milk flow through the valve will fall within the scope of the invention.

It will also be readily obvious to the person skilled in the art that the above described valves may be provided with various types of manual locks to keep them in open position regardless of pressure and liquid flow, for the purpose of flushing and cleaning the system.

What is claimed is:

1. Valve for shutting off and turning on suction-induced flow from a teatcup or teatcups in a milking machine, said valve including:
   a valve body (1) having at least one inlet (2) for milk flow from a teatcup and an outlet for milk flow from said valve, as well as a valve seat, characterized by
   a. a diaphragm mounted in said valve body (1) said diaphragm (4) being movable between an open position permitting flow from said inlet(s) to said outlet, and a closed position sealing against said valve seat, cutting off flow between said inlet(s) (2) and said outlet, b. a manual actuator (5) mounted in or on said valve body (1) to swing or rotate between at least first and second positions, c. a non-extendible link (6) connected between said manual actuator and a point on said diaphragm (4);

the diaphragm (4) being held in its open position by means of said link (6) when said manual actuator is in its first position;

the diaphragm being released to allow it to assume its closed position, when said manual actuator is moved to its second position;

said diaphragm, when in its open position, exerting via the link (6) a force on the manual actuator (5), urging it towards its first position.

2. Valve according to claim 1, characterized in that said manual actuator a lever (5) pivotally mounted in said valve body (1) to pivot between a first end position and a second end position, said link (6) extending between a point on said lever (5) remote from the pivot point of said lever (5) to a point on said diaphragm (4), the diaphragm (4) being held in its open position by means of said link (6) when said lever is in its first end position, the diaphragm being released to allow it to assume its closed position, when said lever is moved to its second end position.

3. Valve according to claim 1, characterized in that said manual actuator is a knob (21) which is rotatably mounted on said valve body (20), and which, when rotated manually, can be moved, supported on a helical surface or helical surfaces of the valve body, from said second position (23b) to said first, diaphragm-open, position; continued rotation from said first position allowing the knob to return precipitously to said second diaphragm-released position.

4. Valve according to claim 3, characterized by a plurality of evenly circumferentially spaced helical surfaces each leading to a first diaphragm-open position followed by a precipitous portion defining a second diaphragm-release position, said knob being supported on all of said plurality of helical surfaces simultaneously.

5. Valve according claim 4, characterized in that said helical surfaces are comprised in grooves (23) and that the knob (21) is hollow and is supported via inward projections (22) from the interior of the knob extending into said grooves.

6. Valve according claim 3, characterized in that said helical surfaces are comprised in grooves (23) and that the knob (21) is hollow and is supported via inward projections (22) from the interior of the knob extending into said grooves.

7. Valve according to claim 1, characterized in that said manual actuator is biased towards its second position;

said diaphragm, when in its open position, exerting via the link (6) an opposing force on the manual actuator (5), urging it towards its first position;

said opposing force, when there is a predetermined suction which induces liquid flow through the valve body, overcoming the biasing force urging the actuator towards its second position; said opposing force not overcoming the biasing force when there is a drop below said predetermined suction for the liquid flow through the valve.

8. Valve according to claim 7, characterized in that said manual actuator is a lever (5) pivotally mounted in said valve body (1) to pivot between a first end position and a second end position, said lever being spring (7) biased towards its second end position, said link (6) extending between a point on said lever (5) remote from the pivot point of said lever (5) to a point on said diaphragm (4), the diaphragm (4) being held in its open position by means of said link (6) when said lever is in its first end position, the diaphragm being released to allow it to assume its closed position, when said lever is moved to its second end position, said diaphragm, when in its open position, exerting via the link (6) an opposing force on the lever (5), urging it towards its first end position, said opposing force, when there is a predetermined suction which induces liquid flow through the valve body, overcoming the spring biasing force urging the lever towards its second end position, said opposing force not overcoming the spring biasing force when there is a drop in the suction for the liquid flow through the valve.

9. Valve according to claim 7, characterized in that said manual actuator is a knob (21) which is rotatably mounted on said valve body (20), and which, when rotated manually, can be moved, supported on a helical surface or surfaces of the valve body, from said second position (23b) to said first, diaphragm-open, position; said rotary knob, when in its first position, being spring-biased to continue automatically rotation from said first position to a precipitous portion or portions allowing it to return to said second diaphragm-released position unless the opposing force, when there is a predetermined flow-inducing suction through the valve body, overcomes the spring biasing force which urges the knob (21) towards its second position, thereby retaining the knob in its first, diaphragm-open position, unless the knob is advanced manually.

10. Milking machine claw comprising a valve as specified in claim 1.

11. Milking system comprising a suction source, a milk receiving container (17), at least one cluster having a claw (13) as specified in claim 10, and at least two teatcups.

* * * * *